United States Patent

Hrovat et al.

Patent Number: 5,732,376
Date of Patent: Mar. 24, 1998

[54] TRACTION CONTROL THROUGH SLIP TARGET MODIFICATIONS

[75] Inventors: Davorin D. Hrovat; Minh N. Tran; Craig J. Simonds, all of Dearborn, Mich.

[73] Assignee: Ford Global Technologies, Inc., Dearborn, Mich.

[21] Appl. No.: 610,922

[22] Filed: Mar. 5, 1996

[51] Int. Cl.$^6$ .................................................. B60K 28/16
[52] U.S. Cl. .......................... 701/80; 701/72; 701/73; 701/90; 73/118.1
[58] Field of Search .......................... 73/116, 117.2, 73/117.3, 118.1; 340/438, 439; 364/426.015, 426.016, 426.017, 426.018, 426.019, 426.025, 426.036; 701/71, 72, 73, 74, 75, 80, 90

[56] References Cited

U.S. PATENT DOCUMENTS

| | | | |
|---|---|---|---|
| 4,848,851 | 7/1989 | Kuraoka et al. | 364/426.016 |
| 4,882,693 | 11/1989 | Yopp | 364/426.015 |
| 5,024,285 | 6/1991 | Fugita | 364/426.03 |
| 5,083,631 | 1/1992 | Nakayama et al. | 364/426.03 |
| 5,305,218 | 4/1994 | Ghoneim | 364/426.016 |
| 5,313,391 | 5/1994 | Sigl et al. | 364/426.036 |
| 5,315,519 | 5/1994 | Chin et al. | 364/426.018 |
| 5,508,924 | 4/1996 | Yamashita | 364/426.015 |

*Primary Examiner*—George M. Dombroske
*Attorney, Agent, or Firm*—Peter Abolins

[57] ABSTRACT

Traction control for an internal combustion engine uses the gas pedal position, steering wheel position and velocity to set a wheel slip target during traction control operation.

3 Claims, 2 Drawing Sheets

TRACTION CONTROL THROUGH SLIP TARGET MODIFICATIONS

BACKGROUND OF THE INVENTION

1. Field of the Invention

This invention relates to electronic engine control of an internal combustion engine.

2. Prior Art

Traction control of various types is known. For example, it is known to reduce the power applied to the driving wheels through various combinations of controlling engine operating parameters such as spark advance, fuel injection, and throttle control. Braking may also be used to control driving wheel rotation.

Even though such control of the driving wheels is known, there still is a need to improve the performance of traction control in various operating environments. Conditions such as vehicle turning and large driver demand are addressed, in part, by this invention.

SUMMARY OF THE INVENTION

This invention uses gas pedal position to set a wheel slip target during traction control (TC) operation. There is a gradual setting of the spinning wheel target for a split-mu operations so that maximum surface force generation capabilities are achieved.

This invention increases driver control through response to the gas pedal position during traction control operation. Thus, there is improved vehicle performance with reduced sluggishness for operation on a split-mu surface.

DETAILED DESCRIPTION OF THE EMBODIMENT

Figure 1:
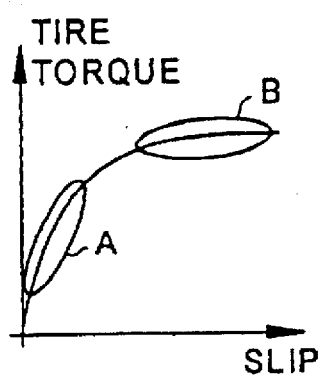
FIG. 1 is a graphic representation of slip versus tire torque.

To offer a driver some level of gas pedal control while in traction control (TC), it is proposed to alter the slip target as a function of gas pedal position, so that the most aggressive slip (close to a maximum tractive force) would result for wide open throttle WOT pedal position and lower slip targets would result proportional to the gas pedal position. The wheel slip target is the maximum desired slip of the vehicle driving wheels with respect to the vehicle non-driving wheels. Such altering of the slip target can give a driver some control during turns, whereby easing on gas pedal he may be able to negotiate a tight turn on slippery roads (while in TC), whereas by fully depressing the pedal he or she will be able to accelerate more (but through a wider turn) to avoid, for example, being hit from the rear.

It is possible to give a driver even more control if one has a steering wheel position sensor or equivalent. In this case, a large steering angle difference with respect to actual wheel force cornering capabilities (and/or fast steering wheel application) would indicate a desire for much sharper turning, just as a large gas pedal position would indicate a desire for much more acceleration. If one encounters both a large steering angle and a large gas pedal position, say on icy surfaces, then some sort of arbitration will be necessary. For example, the resultant action can be in favor of turning with somewhat lower accelerations. A more structured approach to this decision process may be offered using fuzzy logic formalism.

As a further alternative to the previously proposed methods for controlling wheel spin during turning and accelerating, it is hereby proposed to consider two more alternatives. A first alternative builds on the previous idea of changing the slip target as a function of gas pedal position, but this time only if a vehicle is in a turn as established by, for example, a steering wheel sensor, or non-driven wheel speed difference. If the vehicle is on a straight path, the slip target would not be changed from the wide open throttle (WOT) pedal position. This way, for straight away driving or hill climbing, similar acceleration performance will result for part throttle as for WOT pedal positions.

A second alternative, further expands the above concept by using two dimensional tables to modify the target slip, via multipliers, which would depend on both the steering or turning amount, and the gas pedal position. In practice it is expected that only a few values for each of the two axes will suffice where, for example, multipliers close to one would result for no turning condition so that accelerations would be close to WOT.

When the steering wheel sensor is not available for TC one could consider using power-steering pressure sensor as an alternative (assuming it is available). This could give "advanced warnings" about incoming steering maneuver(s) and their magnitudes, which in turn could be used for TC target slip determination.

Since the engine controls the average slip, it is possible that with one wheel in A in FIG. 1 on a higher mu, the brake on the lower mu may not trigger if the corresponding trigger level is above 2* average slip target. To prevent this situation, it is proposed that the brake trigger level be slightly below the above 2* average slip target (at least after the first TC transient). It is possible that the trigger level (which at the beginning of TC may be pretty high) would gradually decrease as a function of a timer that would keep track of one-wheel operations without slip (or in region A). Alternatively, when calculating the average slip instead of equal weights for both wheels (one operating in B and another in A) one could use a much higher weight for the non-spinning wheel in A, to force larger engine torque's and subsequent brake intervention.

Figure 2B:
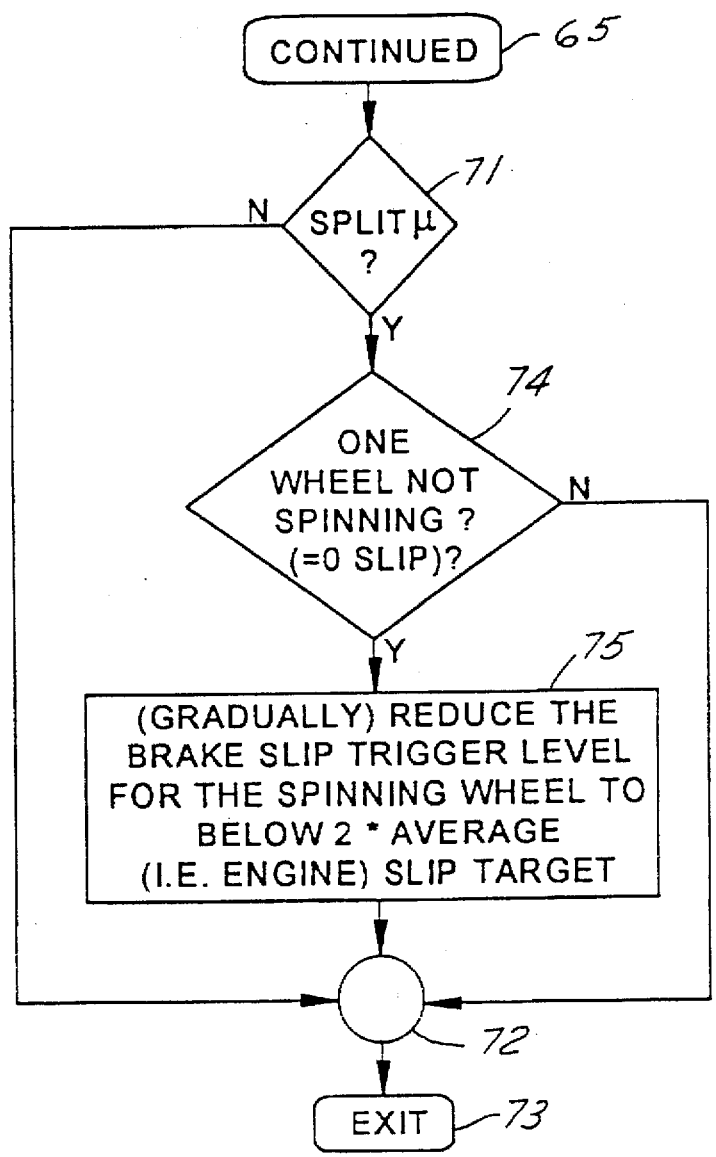
FIGS. 2A and 2B are a logic flow diagram in accordance with an embodiment of this invention.
Figure 2A:
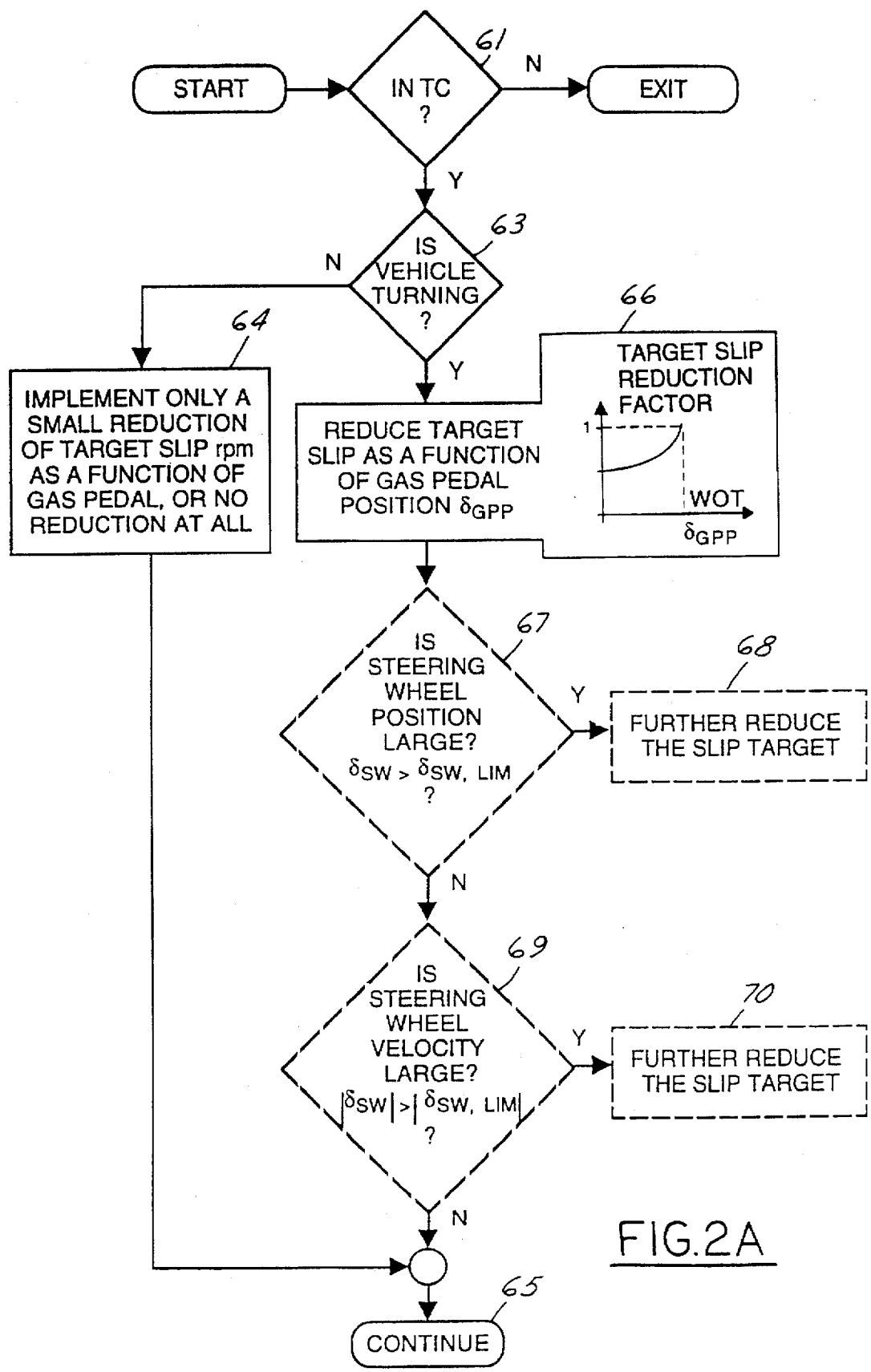

Referring to FIG. 2A, logic flow starts at block 60 and goes to decision 61 where it is asked if the system is in traction control mode of operation. If no, logic flow goes to block 62. If yes, logic flow goes to decision block 63 wherein it is asked if the vehicle is turning. If no, logic flow goes to block 64 wherein there is implemented only a small reduction of target slip RPM as a function of gas pedal or no reduction at all, consistent with reduced cornering force requirements during straight-ahead driving. Logic flow from block 64 then goes to continuation block 65. If at block 63 the vehicle is turning, logic flow goes to block 66 wherein there is a target wheel slip reduction and the target wheel slip is a function of gas pedal position. Block 66 includes a graphical representation of gas pedal position versus the target slip reduction factor.

Logic flow from block 66 goes to decision block 67 wherein it is asked if the steering wheel position is large. If yes, logic flow goes to block 68 wherein there is caused a further reduction in the slip target to maximize the cornering force production capability. If no, logic flow goes to decision block 69 wherein it is asked if the steering wheel velocity is large. If yes, logic flow goes to block 70 wherein there is a further reduction in the slip target. If no, logic flow goes to continuation block 65. Continuation block 65 causes logic flow to go to decision block 71 wherein it is asked if there is a split-mu surface condition. If no, logic flow goes to node 72 which goes to exit block 73. If at block 71 there is a split-mu, logic flow goes to decision block 74 wherein it is asked if one wheel is not spinning. If no, logic flow goes to block 72. If yes, logic flow goes to block 75 wherein there is a gradual reduction of the brake slip trigger level for the spinning wheel to below two times the average slip target. That is, when there are two driving wheels, and one driving wheel is slipping and the other driving wheel is not slipping, the average engine slip is one-half the sum of the slips of the two driving wheels.

Referring to block 63, the vehicle in a turning state can be determined using non-driven wheel speeds, steering wheel sensor and/or power steering pressure sensor. Blocks 67, 68, 69 and 70 are optional since they are only possible if the steering wheel sensor is available. If desired, a more involved modification in blocks 66, 68 and 70 can be based on a two-dimensional table when calculating the average slip target. If desired, a more involved modification can be based on a two-dimensional table based on gas pedal position and vehicle steering.

Various modifications and variations will no doubt occur to those skilled in the arts to which this invention pertains. Such variations which basically rely upon the teachings through which this disclosure has advanced the art are properly considered within the scope of the claims.

We claim:

1. A method of controlling traction of a vehicle having a steering wheel, a gas pedal, a pair of driving wheels, and an internal combustion engine, said method including the steps of:

determining whether or not traction control is desired;

determining if the vehicle is turning;

determining gas pedal position;

establishing a predetermined maximum desired target wheel slip;

reducing the target wheel slip as a function of gas pedal position;

determining steering wheel position;

determining steering wheel velocity;

setting predetermined steering wheel position;

setting a predetermined steering wheel velocity;

comparing the determined steering wheel position to the predetermined steering wheel position;

further reducing the wheel slip target if the steering wheel position is greater than the predetermined steering wheel position;

comparing the determined steering wheel velocity to the predetermined steering wheel velocity; and further reducing the wheel slip target if the steering wheel velocity is greater than the predetermined steering wheel velocity.

2. A method of controlling traction as recited in claim 1 further including the steps of:

determining if one of the pair of driving wheels is not spinning; and reducing the brake slip trigger level for the spinning wheel control below double the average engine slip target.

3. A method of controlling traction as recited in claim 2 including the step of reducing the wheel slip target more if the vehicle is turning than if the vehicle is not turning.

* * * * *